(No Model.)
E. A. HARRINGTON.
CORN HARVESTER.
No. 493,710. Patented Mar. 21, 1893.
Fig. 1.
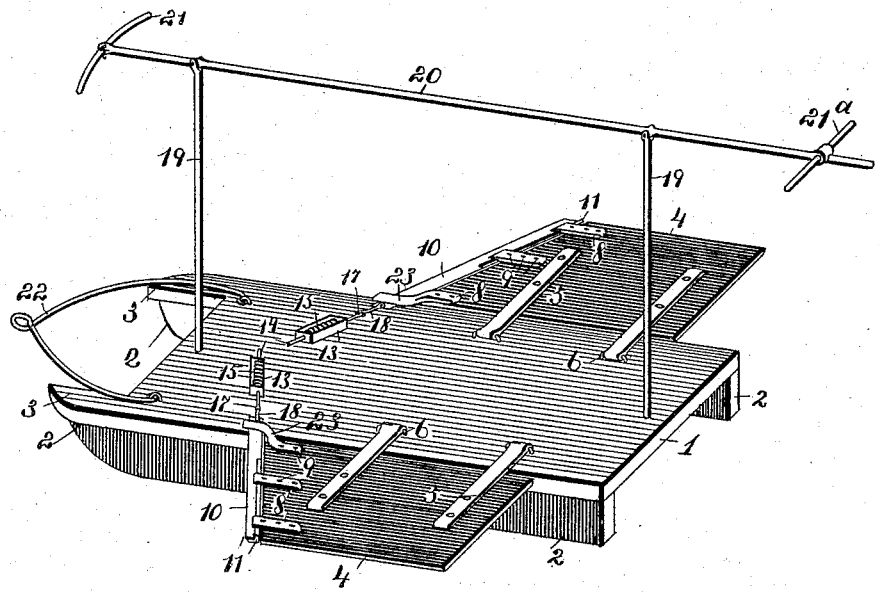
Fig. 4.
Fig. 2.
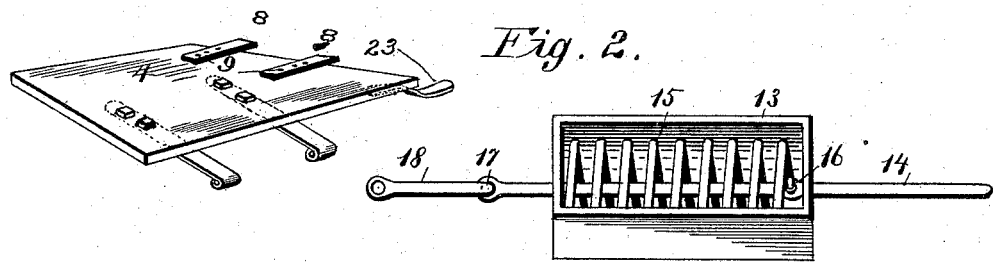
Fig. 3.
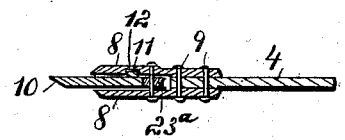
Witnesses:
F. G. Fischer
Jno. L. Coudon
Inventor:
E. A. Harrington
By Higdon & Higdon
Attys

UNITED STATES PATENT OFFICE.

ERNEST A. HARRINGTON, OF BELOIT, KANSAS.

CORN-HARVESTER.

SPECIFICATION forming part of Letters Patent No. 493,710, dated March 21, 1893.

Application filed August 27, 1891. Serial No. 403,881. (No model.)

*To all whom it may concern:*

Be it known that I, ERNEST A. HARRINGTON, of Beloit, Mitchell county, Kansas, have invented certain new and useful Improvements in Corn-Harvesters, of which the following is a full, clear, and exact description, reference being had to the accompanying drawings, forming a part hereof.

My invention relates to appliances for cutting and gathering corn-stalks from the field, and the objects of my invention are to produce a simple, inexpensive, and durable form of corn-stalk harvester which shall be rapid and effective in its operation and which shall be of light draft.

To the above purposes, my invention consists in certain peculiar and novel features of construction and arrangement, as hereinafter described and claimed.

In order that my invention may be understood, I will proceed to describe it with reference to the accompanying drawings, in which:—

Figure 1 is a perspective view of a corn-stalk harvester constructed in accordance with my invention. Figs. 2 and 3 are detached views, in perspective and section respectively, of certain details of construction to be hereinafter described. Fig. 4 is an inverted perspective view of one of the knife or cutter-carrying extensions, in inverted condition.

In the said drawings, 1 designates the body or top-platform of my improved harvester, said body being of oblong rectangular form and of any suitable or preferred dimensions, the intention being that the body of the harvester shall be of such width as to be drawn easily between two rows of corn-stalks, and also of such area as to permit two operators to stand upon the said top-platform. This platform is supported at its sides upon two runners 2 which extend longitudinally of the top-platform 1 at opposite sides thereof and also from the rear end of the same, to and preferably somewhat beyond its front end, as shown in Fig. 1. At its front end the platform 1 is preferably formed or provided with two forwardly projecting extensions 3 which are located at opposite corners of the front end of the sled body, and to which the front ends of the sled-runners 2 are attached; the outer sides of said extensions being curved rearwardly and outwardly as shown for the purpose of directing the lower parts of the standing corn-stalks to the knives as hereinafter described.

4 designates two side platforms or extensions which are connected each to one side of the body 1 by a pair of hinges 5. These hinges 5 are bolted or otherwise suitably secured to the upper surfaces of said platforms or extensions 4 and are of considerable length, approximately as shown, so as to sustain not only the weight of the platforms themselves, but also the weight of the operators while they are handling the corn-stalks. Through the inner end of each of the hinges 5 of each extension-platform 4 passes a staple 6 which is also inserted into the platform 1 in pairs near each side thereof, as shown. These extensions 4 are of approximately trapezoidal form, and may be attached to the sled body in the precise positions shown in the drawings, or they may be set either farther forward or farther backward as desired. In either event, the front edge or margin of each of the extension platforms is inclined outwardly and rearwardly, as shown, and for a purpose to be presently explained, and upon the upper and lower sides of these extension platforms are secured by bolts or rivets 9 or other equivalent devices, any suitable number of supports or guides 8 which extend forwardly beyond the forwardly inclined front margin of the platform 4.

In the drawings each extension platform is shown as provided with two upper and two lower supports or guides, but it is obvious that a greater or less number of said supports or guides may be employed as circumstances may suggest. In addition to the supports or guides 8 a third support or guide 23, of approximately S-form is bolted or otherwise suitably secured to the upper side of each extension platform 4 near the inner corner thereof, and these supports serve, when the extension platforms are in extended or operative position to support said platforms the front ends of the supports 23 resting upon the upper side of the platform 1 for this purpose.

Between the upper and lower sets of supports or guides 8 of each extension platform 4 are interposed elongated cutter-blades 10, the said cutter-blades thus extending obliquely outward and rearward from opposite sides of the top-platform 1, near the front end thereof. The outer portion of the upper side of each of the cutter blades is formed with a longitudinal rib 11 which works through a recess 12 which is formed on the under side of each guide or support 8.

13 designates two elongated frames or boxes which are secured upon the front part of the top-platform 1 and through which pass longitudinally two rods 14. Within its box or frame 13 each of these rods 14 is surrounded by a coiled spring 15. The outer end of each of these springs 15 presses upon the inner side of the outer end of each frame or box 13, while the inner end of said spring abuts against a cross-pin 16 or an equivalent device. The purpose of this arrangement will be hereinafter described. At its outer end each of the rods 14 is connected, by a joint 17, to the inner end of a short rod 18, the outer hooked ends of said rods 18 being inserted through openings or eyes in the inner ends of the cutting-blades. Two or more anti-friction rollers 23ª are journaled in the guides or supports above described and are interposed between the rear edges of the cutting blades and the front margin of the extension platform, and these rollers serve to remove the friction which would be otherwise developed by the movements of the cutters.

19 designates two uprights or standards which are secured in vertical position, the one at the front and the other at the rear end of the top-platform 1, as shown, and to the upper ends of these standards is secured a horizontal supporting-bar 20 which extends longitudinally of the sled-body. The supporting bar 20 extends forwardly and rearwardly beyond the front and rear standards 19 respectively, and at its front end said supporting-bar carries a segmental cross-support 21; the arms of said cross-support extending rearwardly and laterally as shown. A suitable clevis 22 is connected at its ends to the front end of the sled-body, and to this clevis the draft animal is to be hitched.

The animal being hitched to the clevis 22, as described, the extension platforms 4 are turned into outward position as shown in Fig. 1, and the operators take their places, one at each side of the supporting-bar 20. The sled is now drawn along between two rows of corn and the operators catch each hill of stalks as they approach the cutting-blades. As the cutting blades strike the butts or lower parts of the corn-stalks, the knives are moved outward a short distance, compressing the springs 15, and as the sled continues on its way the expansive action of the springs retracts the cutting-blades, or moves them inward toward the top-platform 1, and thus causes the cutting blades to operate with a shearing action across the butts of the stalks and thus quickly sever the stalks from the stubs. As soon as the stalks have been so severed, the operators stand them upon the top-platform 1 in such position that they lean inward against the supporting-bar 20; the end cross-supports preventing the stalk from slipping off of the supporting-bar endwise. These operations are continued until the sled is fully loaded, after which the load is discharged at any place, desired, and the operation is continued. After the work has been completed, the extension-platforms are turned back upon the top-platform 1, the joints 17 permitting the knives or cutting-bars to move with said platforms. Through the rear end of the supporting-bar 20 extends a removable cross-bar or pin 21ª, which is of straight form. This pin is used in forming the shocks of cut stalks, in the following manner. After the sled has received its load, the operators alight and taking the stalks from the sled place them butts down upon the ground leaning oppositely against opposite sides of each end of the removable bar or pin 21ª. After the stalks have all been thus shocked, the cross-pin is withdrawn from the rear end of the supporting-bar; the shock being previously bound, if desired.

From this description, it will be seen that the device is simple, durable, and inexpensive in construction, and that it is effective and rapid in operation, completely severing the stalks from the stubs.

Having thus described my invention, what I claim as new therein, and desire to secure by Letters Patent, is—

1. An improved corn-stalk harvester comprising a sled-like body-portion, hinged platforms located at opposite sides of said body-portion and each provided with a rearwardly and outwardly extending front end or margin, and spring-retracted cutters mounted on said front ends or margins of the platforms and movable longitudinally thereon, substantially as set forth.

2. An improved corn-stalk harvester, comprising a sled-like body-portion, hinged extension platforms located at opposite sides of said body portion, cutters movable inwardly and outwardly upon inclined front margins of said platforms, spring retracted rods working in boxes or frames secured upon the sled-body, and jointed rods connecting the cutters to said spring-retracted rods, substantially as set forth.

3. An improved corn-stalk harvester, comprising a sled-like body-portion, having vertical standards or uprights, and a longitudinal supporting bar secured to said uprights, and provided at its rear end with a removable transverse shocking-pin, substantially as set forth.

In testimony whereof I affix my signature in presence of two witnesses.

ERNEST A. HARRINGTON.

Witnesses:
H. E. PRICE,
JNO. L. CONDRON.